United States Patent [19]

Huybrechts et al.

[11] Patent Number: 4,623,565

[45] Date of Patent: Nov. 18, 1986

[54] COATED MICROWAVE COOKWARE

[75] Inventors: Jozef T. Huybrechts, Oud Turnhout, Belgium; Lawrence W. McKeen, Stratford, N.J.

[73] Assignee: E. I. Du Pont de Nemours and Company, Wilmington, Del.

[21] Appl. No.: 739,585

[22] Filed: May 30, 1985

[51] Int. Cl.$^4$ ............................ B32B 5/16; H05B 6/64
[52] U.S. Cl. ..................................... 428/35; 428/363; 428/414; 428/324; 428/447; 428/448; 428/450; 428/483; 428/697; 219/10.55 R; 219/10.55 E
[58] Field of Search ................. 428/35, 363, 414, 324, 428/447, 448, 450, 483, 697

[56] References Cited

U.S. PATENT DOCUMENTS

| | | | |
|---|---|---|---|
| 4,064,303 | 12/1977 | Vassiliou | 428/458 |
| 4,223,069 | 9/1980 | Berghmans | 428/414 |
| 4,391,767 | 7/1983 | Pears | 428/483 |

Primary Examiner—P. C. Ives
Attorney, Agent, or Firm—Richard H. Burgess

[57] ABSTRACT

An article of microwave cookware with a thermoset polyester substrate coated with an epoxy primer and a silicone resin topcoat which has two silicone resins with different methyl:phenyl ratios, one higher and the other lower to optimize both hardness and non-stick characteristics of the coating.

7 Claims, No Drawings

COATED MICROWAVE COOKWARE

BACKGROUND

Various kinds of plastic substrates have been used for microwave cookware. Relatively low maximum use temperatures have limited applications for polypropylene, polycarbonate and polysulfone substrates. However, polyester substrates can be made which can be exposed to use temperatures up to 232° C.

It is desirable to provide cookware with release or non-stick coatings so that food residues can be removed easily as the cookware is cleaned. High performance non-stick coatings generally include fluorocarbon resins such as polytetrafluoroethylene and require curing temperatures substantially above 232° C. Silicone resin (or polysiloxane) coatings can be cured at lower temperatures but traditionally have characteristics which cause the coatings not to last as long as or perform as well as fluorocarbon resin coatings on cookware.

Prior attempts to provide silicone resin coatings have not given as high a level of performance as is desirable for certain microwave cookware applications.

U.S. Pat. No. 4,369,279 (Jan. 18, 1983)—Emerick provides a single-coat silicone resin, epoxy coating composition containing a small amount of fluorocarbon polymer and curable at 107° C.

U.S. Pat. No. 4,181,686 (Jan. 1, 1980)—Vassiliou and its divisions 4,180,613 and 4,183,998 concern silicone resin coatings containing a relatively tough and sticky particulate organic modifier to provide improved craze resistance for thicker coatings.

U.S. Pat. No. 4,223,069 (Sept. 16, 1980)—Berghmans provides a three-coat system including an epoxy primer and different types of silicones having specified hydroxyl contents in the intermediate and topcoats.

U.S. Pat. No. 4,252,702 (Feb. 24, 1981)—Wald concerns a silicone- and epoxy-containing coating composition.

U.S. Pat. No. 4,477,517 (Oct. 16, 1984)—Rummel concerns a baking pan with a multilayer coating including a primer containing a silicone resin and a silicone oil and a topcoat containing a silicone resin, colloidal silica and flake pigment.

Each of these patents are incorporated by reference herein.

SUMMARY OF THE INVENTION

The present invention provides an article of cookware comprising a substrate of thermoset polyester coated with a multilayer coating, characterized in that the coating comprises a primer layer consisting essentially of epoxy resin, crosslinker resin, curing catalyst, and optional pigmentation, and a topcoat layer consisting essentially of two silicone resins, curing catalyst, and optional pigmentation, the first of said silicone resins having a methyl:phenyl molar ratio in the range of 1:1 to 1:1.25, and the second of said silicone resins having such a ratio in the range of 1:1.75 to 1:2.25, and the proportions by weight of said first and second resins being in the range of 67–88% second resin, balance first resin.

Preferably, the invention provides such an article adapted for use in microwave ovens wherein the polyester resin is reinforced with fiberglass and the primer layer contains epoxy resin, benzoguanamine-formaldehyde resin crosslinker, docecylbenzene sulfonic acid catalyst and pigmentation, and the topcoat layer contains two silicone resins in proportion by weight of about 15 to 25% of a first resin which has a methyl to phenyl molar ratio in the range of 1:1.05 to 1:1.2 and 85 to 75% of a second resin having such a ratio in the range of 1:1.85 to 1:2.0, said topcoat layer also containing butyl titanate and zinc octoate catalysts and pigment-coated mica flake.

DETAILED DESCRIPTION

The present invention uses ingredients which individually have been previously known in the art but which are combined in a novel manner to provide superior results as coated microwave cookware, including adhesion, both intercoat and to the substrate, nonstick or release of food residues and abrasion resistance.

The substrate for cookware of the invention is a thermoset polyester resin (typically 20–30% by weight based on the total) which can be reinforced by fiberglass (8–13%). As is known, such compositions can include fillers such as calcium carbonate (45–65%), pigments to obtain desired colors (0.05–1.0%) and other adjuvants such as catalysts, inhibitors, thermoplastic resins, mold release agents, and other ingredients. Such thermoset polyester substrates can be used at temperatures up to about 232° C. Coating systems which which can be applied and cured at peak temperatures in the range of 204° to 232° C. can be used on such substrates. Fluorocarbon and silicone resin coating systems which require higher curing temperatures than 232° C. are not suitable for use on such cookware.

Coating systems for such applications must be acceptable for food contact and must be versatile enough to accomodate variations in substrate composition. Because of the use of mold release agents in the substrates, a primer with good adherence is required. Grit blasting which is often used to prepare metal substrates for cooking is not suitable for molded plastic substrates since it would strip off the hard surface layer often found on the molded plastic. This makes the primer adhesion more critical.

As for the topcoat, individual silicone resins which are commercially available do not have the necessary combination of properties including curing below 232° C. and providing a durable, non-stick coating. It has been found that a mixture of a smaller amount of a first silicone resin with a lower methyl:phenyl molar ratio to give good hardness and a larger amount of a second silicone resin with a higher methyl:phenyl ratio to give good release, permits the design of a superior coating. As is known in the art, the silicone resins are actually polysiloxane precondensates which crosslink on curing, such as by reaction through hydroxyl groups. A discussion of the chemistry of such silicone resins is in the above-identified Vassiliou patents.

Preferably, the first resin has an approximate composition by weight of the following groups:

methyl 48%, phenyl 44%, hydroxyl 4%, 0-butyl 2%, 0-propyl 1%, and the second resin has methyl 53%, phenyl 30%, O-ethyl 12%, O-trimethylol propane (TMP) 5%, O-ethylene glycol (a trace). In the second resin the hydroxyl groups for curing are pendant in the TMP groups. Curing proceeds by reaction, preferably catalyzed, of hydroxyl groups with organofunctional groups and with epoxy groups, and of organofunctional groups with each other.

In the examples, parts, proportions and percentages are by weight except where indicated otherwise. Preferred ingredients are illustrated.

EXAMPLE 1—COATING

A suitable thermoset polyester microwave cookware pan was coated by spraying it with a primer made by mixing

| | |
|---|---|
| "Epon" 1007 epoxy resin (Shell) | 268.93 |
| Benzoguanamine-formaldehyde resin | 39.78 |
| Pigment dispersion in melamine resin | 306.92 |
| Docecylbenzene sulfonic acid catalyst | 0.72 |
| "Modaflow" acrylic polymer surface active agent (Monsanto) | 7.23 |
| Acetone | 99.82 |
| Methyl isobutyl ketone | 144.60 |

The substrate can but need not be slightly warmed if desired (up to 10° to 15° C.) both before and after spraying on the primer.

Then the topcoat is applied by spraying onto the primer which can but need not be still wet a coating made by mixing first a flattener suspension of

| | |
|---|---|
| First silicone resin DC6-2230 (Dow Corning) | 12.69 |
| Second silicone resin solution Silikophen 300 (Goldschmidt) (50% solids in xylene) | 75.11 |
| Diatomaceous earth | 11.20 | with a clear coating, using the above ingredients, of

| | |
|---|---|
| Second silicone resin solution | 422.83 |
| Flattener suspension | 369.91 |
| Methyl isobutyl ketone | 68.04 |
| Zinc octoate catalyst solution | 3.93 |
| Butyl titanate catalyst | 3.93 |
| Pigment coated mica "Afflair" flake | 4.36 |

The whole coating system was then cured on the substrate at 221° C. for 15 minutes, or up to 232° C. for 20 minutes.

EXAMPLE 2—TESTING

Cookware coated according to Example 1 was tested by cooking in a microwave oven. Macaroni and cheese released in 1 to 3 shakes, left only a slight residue after 9 cookings, cleaned easily, and the intregity of the coating was maintained. Hamburgers cooked 12 times continued to give easy release and cleaning with no deterioration in performance. Tomato sauce held 16 hours at 66° C. resulted in no staining or changes in coating integrity.

We claim:

1. An article of cookware comprising a substrate of thermoset polyester coated with a multilayer coating, wherein the coating consisting essentially of
   a primer layer consisting essentially of epoxy resin, crosslinker resin, curing catalyst, and up to an effective amount of pigmentation, and
   a topcoat layer consisting essentially of two silicone resins, curing catalyst, and pigmentation, the first of said silicone resins having a methyl:phenyl molar ratio in the range of 1:1 to 1:1.25, and the second of said silicone resins having such a ratio in the range of 1:1.75 to 1:2.25, and the proportions by weight of said first and second resins being in the range of 67–88% second resin, balance first resin.

2. The article of claim 1 wherein the polyester substrate is reinforced with fiberglass.

3. The article of claim 1 which is adapted for use in microwave ovens.

4. The article of claim 1 wherein the crosslinker resin in the primer layer is a benzoguanamine formaldehyde.

5. The article of claim 1 wherein the topcoat contains pigment-coated mica flake.

6. The article of claim 1 wherein said ratio of first resin is in the range of 1:1.05 to 1:1.2, said ratio of said second resin is in the range of 1:1.85 to 1:2.0, and said proportions are in the range of 75 to 85% of said second resin.

7. The article of claim 1 adapted for use in microwave ovens wherein the polyester resin is reinforced with fiberglass and
   the primer layer contains epoxy resin, benzoguanamine-formaldehyde resin crosslinker, docecylbenzene sulfonic acid catalyst and pigmentation, and
   the topcoat layer contains two silicone resins in proportion by weight of about 15 to 25% of a first resin which has a methyl to phenyl molar ratio in the range of 1:1.05 to 1:1.2 and 85 to 75% of a second resin having such a ratio in the range of 1:1.85 to 1:2.0, said topcoat layer also containing butyl titanate and zinc octoate catalysts and pigment-coated mica flake.

* * * * *